Jan. 5, 1943.  D. C. HUBBARD  2,307,727
TREAD UNIT FOR SHOES
Filed May 14, 1941
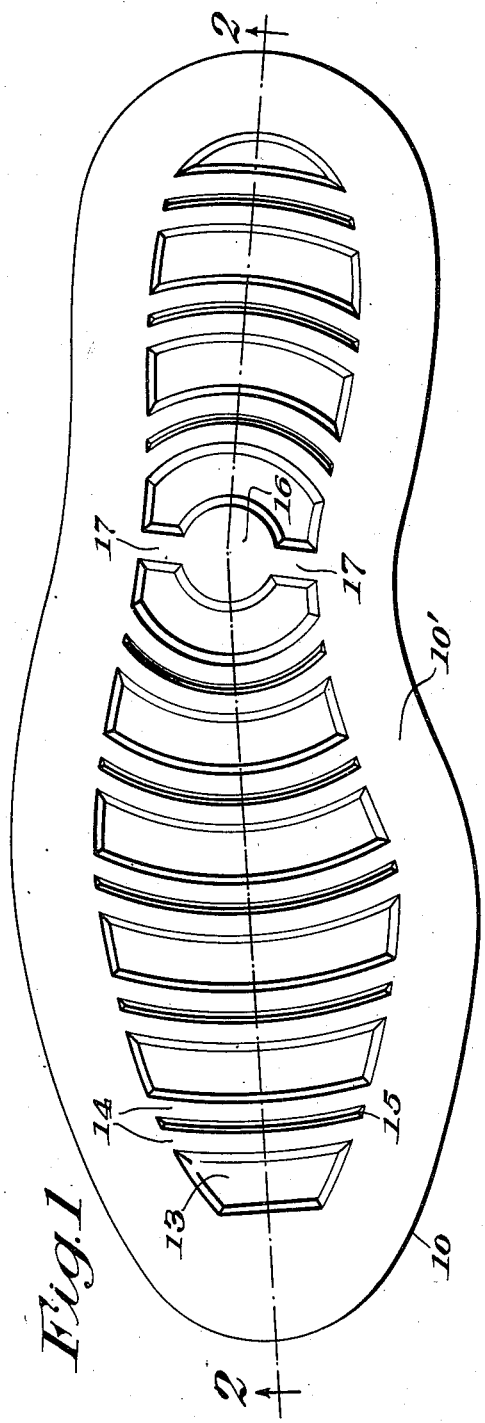
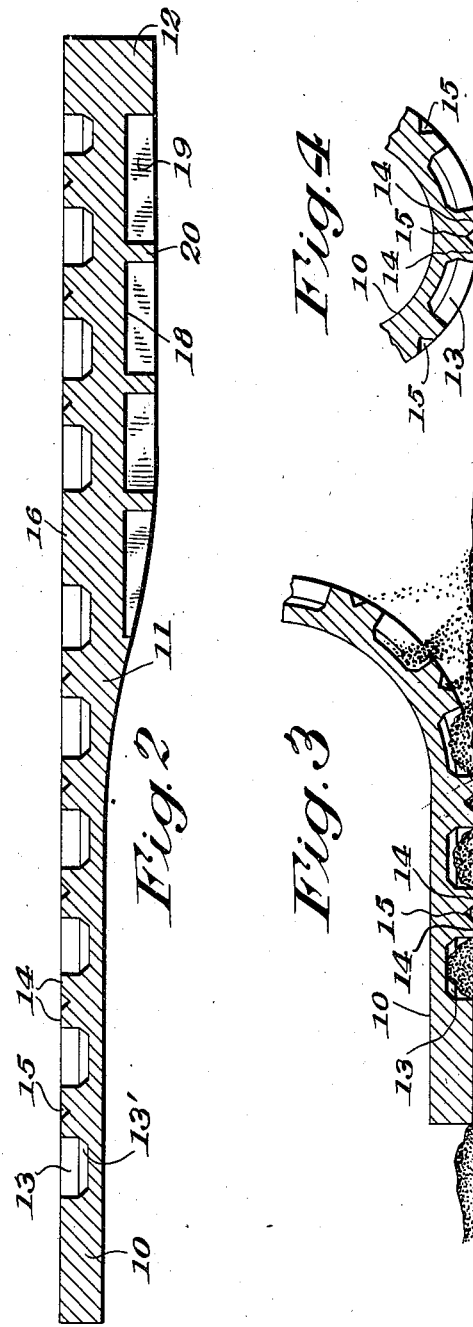
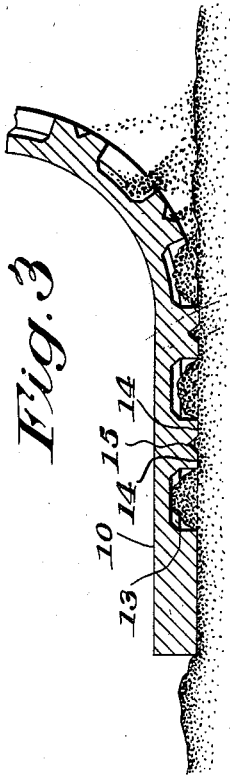
Inventor:
Don C. Hubbard
By Spear, Rawlings & Spear
Attorneys.

Patented Jan. 5, 1943

2,307,727

UNITED STATES PATENT OFFICE 2,307,727

TREAD UNIT FOR SHOES

Don C. Hubbard, Auburn, Maine

Application May 14, 1941, Serial No. 393,356

6 Claims. (Cl. 36—59)

This invention relates to the thread member of a shoe, hereinafter called for brevity a "sole," and particularly to a shoe sole of the one-piece type in which the sole and heel are molded as a unit from rubber or other plastic material. The principles of my invention are applicable however to soles or heels which are made from flexible stock other than rubber or equivalent plastic material, and to soles which are not in one-piece with their heels.

The general object of my invention is to provide a sole, the tread surface of which is so constructed as to offer the maximum anti-slipping or gripping effect consistent with the essential qualities of serviceable wear and the support and protection of the foot, and at the same time to be self clearing in use so that snow, ice, dirt or other foreign matter tending to attach itself thereto will be readily dislodged.

Other objects and advantages will appear hereinafter.

In the drawing:

Fig. 1 is a plan view of the tread face of a shoe sole in accordance with my invention.

Fig. 2 is a longitudinal section thereof, on the line 2—2 of Fig. 1.

Fig. 3 is a fragmentary section illustrating diagrammatically the self-clearing action of the sole, and Fig. 4 is a fragmentary section illustrating diagrammatically the anti-slipping action of the sole.

As shown, the tread unit is a sole of the one-piece molded type, presenting integral forepart, shank and heel parts, designated 10, 11 and 12, respectively. It may be molded from any suitable plastic or vulcanizable composition, as rubber or rubber-like materials.

During the process of molding and vulcanization, if of vulcanized rubber, the tread unit is formed in its tread face with a plurality of transversely extending recesses 13 which are inset from the marginal portion 10' of the unit and are spaced apart from each other by intervening cleat-like webs 14. The webs are preferably provided with relatively shallow grooves 15 extending from end to end thereof.

The recesses are relatively deep and act as suction cups to provide an anti-slipping or ground-gripping effect (see Fig. 4) as well as increasing the flexibility of the tread unit. They are not so deep, however, as to weaken or otherwise detract from the wearing quality of the tread unit. At the bases of the recesses the webs 14 and the side walls of the marginal portion 10' bounding said recesses are beveled outwardly and upwardly as indicated at 13' (Fig. 2) so as to form elastic surfaces which facilitate expulsion of any dirt, snow, ice or other foreign matter entrapped in said recesses by simple flexation of the webs 14 (see Fig. 3).

The webs 14 are flush with the marginal area 10' of the sole surrounding the recesses and webs and furnish with said marginal area the tread surface of the unit.

The relatively shallow grooves 15 of the webs increase the flexibility of the webs as well as themselves acting as suction cups (see Fig. 4), especially when the sole is flexed and the suction in the main cups 13 is thereby broken, thus insuring reliable anti-slipping action at all times and under all conditions of service.

In the one-piece unitary structure illustrated, the tread face of the unit is stiffened in the region of the shank by an arch supporting area 16 preferably in the form of a disc or stud. The stud 16 is flush with the ribs 14 and is connected to the marginal area 10' of the sole by radial ribs 17 which are likewise flush with the webs 14.

The recesses and webs are developed on arcs which are substantially concentric with said stud 16, the curvature of the recesses and webs at one side of said stud being reversed to that of the recesses and webs at the opposite side of said stud (see Fig. 1).

At this zone transversely of the shank portion 11 the reversal of the curvatures of two adjacent recesses and their defining webs come just under the instep of the wearer at the base of the instep of the foot. This positions the stud 16 where it can support the arch during its flexations and distributes pressures over the circular area so defined in all directions so that it becomes an axis of such movements and of the bending or turning as the wearer's foot may make in walking.

If desired, the tread unit in the region of the heel may be lightened by removal of some of the material of the unit. This may be conveniently accomplished by molding in the upper face of the heel a plurality of relatively deep inset recesses 18 which are preferably separated from one another by longitudinally and transversely intersecting ribs 19 and 20 (see Fig. 2). The upper edges of said ribs are flush with the upper face of the unit. Alternatively, one large recess may be provided instead of the plurality of small individual recesses 18.

Tread members according to my invention may be embodied in any desired types of shoe structure by usual methods of factory fabrication as will be obvious to those skilled in shoe manufacture.

What I therefore claim and desire to secure by Letters Patent is:

1. A tread unit for a shoe, comprising a flexible member, the tread surface of which has a continuous flat ground-contacting portion about its marginal edge and a plurality of spaced recesses constituting suction cups inset from said ground-contacting portion and extending transversely of said member below the plane of said ground-contacting portion, and a plurality of cleat-like webs disposed substantially flush with said ground-contacting portion and spacing said recesses from each other, the webs having transverse grooves in their ground-contacting faces constituting suction cups of less depth than said recesses, the bases of said webs being outwardly beveled to assist in expelling foreign matter lodging in said recesses upon flexation of the tread unit, the recesses and webs being developed on arcs which are concentric with a common center located substantially in the region of the instep of a wearer's foot, and the curvature of the recesses and webs which are located forwardly of said common center being reversed to that of the recesses and webs which are located rearwardly of said common center.

2. A molded rubber shoe sole having a continuous flat ground contact surface about its margin and having transverse inter-marginal pockets, transverse arcuate cleat-like webs between said pockets and substantially flush with said marginal ground-contacting surface, one pair of recesses defining centrally of the shank zone a substantially circular combined pocket, and a post member centrally of said combined pocket.

3. The shoe sole of claim 2, the post member being substantially flush with the marginal ground-contacting surface of the sole.

4. The shoe sole of claim 2, the curvature of the pockets and webs which are located forwardly of said post member being reversed to that of the pockets and webs which are located rearwardly of said post member.

5. A tread unit for a shoe, comprising a flexible member, the tread surface of which has a continuous flat ground-contacting portion about its marginal edge and a plurality of spaced recesses constituting suction cups inset from said ground-contacting portion and extending transversely of said member below the plane of said ground-contacting portion, and a plurality of cleat-like webs disposed substantially flush with said ground-contacting portion and spacing said recesses from each other, and a post member located substantially in the region of the instep of a wearer's foot, the outer face of said post member being substantially flush with the marginal ground-contacting portion of the tread unit, and said webs and recesses being developed on arcs which are concentric with said post member, the curvature of the recesses and webs which are located forwardly of said post member being reversed to that of the recesses and webs which are located rearwardly of said post member.

6. A molded rubber shoe sole having a marginal ground-contacting surface having transverse inter-marginal pockets, transverse cleat-like webs between said pockets and a post member located substantially in the region of the instep of a wearer's foot, said webs and post member being substantially flush with said marginal ground-contacting surface.

DON C. HUBBARD.